United States Patent [19]

Laczko, Sr. et al.

[11] Patent Number: 5,425,061
[45] Date of Patent: Jun. 13, 1995

[54] METHOD AND APPARATUS FOR BIT STREAM SYNCHRONIZATION

[75] Inventors: Frank L. Laczko, Sr., Allen; Karen L. Walker, Richardson, both of Tex.

[73] Assignee: Texas Instruments Incorporated, Dallas, Tex.

[21] Appl. No.: 71,744

[22] Filed: Jun. 7, 1993

[51] Int. Cl.⁶ .................. H04L 7/00; H04L 23/00; H04J 3/22

[52] U.S. Cl. .................. 375/371; 375/377; 370/84

[58] Field of Search .......... 375/118, 121; 370/84

[56] References Cited

U.S. PATENT DOCUMENTS

| | | | |
|---|---|---|---|
| 5,122,875 | 6/1992 | Raychaudhuri et al. | 358/133 |
| 5,162,746 | 11/1992 | Ghoshal | 375/118 |
| 5,276,688 | 1/1994 | Urbansky | 375/118 |
| 5,297,172 | 3/1994 | Shenoy et al. | 375/118 |
| 5,297,180 | 3/1994 | Upp et al. | 375/118 |
| 5,313,502 | 5/1994 | Nawrocki et al. | 375/118 |
| 5,321,717 | 6/1994 | Bonnet et al. | 375/118 |
| 5,327,430 | 7/1994 | Urbansky | 375/118 |

*Primary Examiner*—Edward L. Coles, Sr.
*Assistant Examiner*—Kimberly A. Williams
*Attorney, Agent, or Firm*—Warren L. Franz; W. James Brady, III; Richard L. Donaldson

[57] ABSTRACT

A data processing system (10) is described which comprises an integrated decoder circuit (12) comprising an input buffer (14) and an error signal generator circuit (18). The error signal generator circuit (18) generates a pulse width modulated error signal output to a clock processing circuit (20). The clock processing circuit (20) may comprise a low pass filter (24) and a variable oscillator (26). The clock processing circuit (20) supplies a clock signal to a digital-to-analog converter (16). The digital-to-analog converter (16) uses the clock signal to correctly track the bit rate for the encoded bit stream received by decoder system (12).

35 Claims, 1 Drawing Sheet

METHOD AND APPARATUS FOR BIT STREAM SYNCHRONIZATION

TECHNICAL FIELD OF THE INVENTION

This invention relates in general to the field of electronic systems and more particularly to a system and method for performing bit stream synchronization.

BACKGROUND OF THE INVENTION

The Motion Pictures Expert Group (MPEG) has promulgated the MPEG audio and video standards for compression and decompression algorithms to be used in the digital transmission and receipt of audio and video broadcasts in ISO-11172. The MPEG audio standard provides for the efficient compression of data according to an established psychoacoustic model to enable real-time transmission, decompression and broadcast of CD quality sound. The MPEG audio standard provides for three possible modes of data transfer. The first mode is audio and visual data plus information to be used to synchronize the broadcast of the audio and video portions. The second mode of possible data transmission involves audio information and information that can be used to synchronize the audio information with a video system. The third and final mode of possible data transmission comprises only audio data.

The first two modes of MPEG data transmission provide information in the bit stream to synchronize the bit stream and specify the rate at which the decoded bit stream is to be presented to the listener. The MPEG standard provides for a variety of bit rates and sampling rates. If the data is decoded and presented at a different rate than the rate at which the data was encoded, either underflow or overflow of the decoded data can result. Either of these conditions can result in errors in the output audio signal.

SUMMARY OF THE INVENTION

Accordingly, a need has arisen for a system that can recover the appropriate bit rate from an encoded bit stream that does not contain information specifically identifying the exact rate at which the bit stream was encoded.

In accordance with the teachings of the present invention, an audio decoding system is provided which substantially reduces or eliminates disadvantages associated with prior systems and methods of decoding encoded bit streams.

According to one embodiment of the present invention, a data processing system is provided that comprises a bit stream decoder circuit operable to receive an encoded bit stream, decode the bit stream and output pulse code modulated data to a digital-to-analog converter. The bit stream decoder circuit comprises circuitry for determining the average bit rate of information received in the encoded bit stream. The bit stream decoder circuit also comprises circuitry for providing a pulse width modulated error signal indicative of the determined average. The system also comprises circuitry for converting the pulse width modulated error signal for clocking into a clock signal output to the digital-to-analog converter circuit.

BRIEF DESCRIPTION OF THE DRAWINGS

A more complete understanding of the technical advantages of the present invention may be acquired by referring to the attached FIGS. wherein like reference numbers indicate like features and wherein.

DETAILED DESCRIPTION OF THE INVENTION

Figure 1:
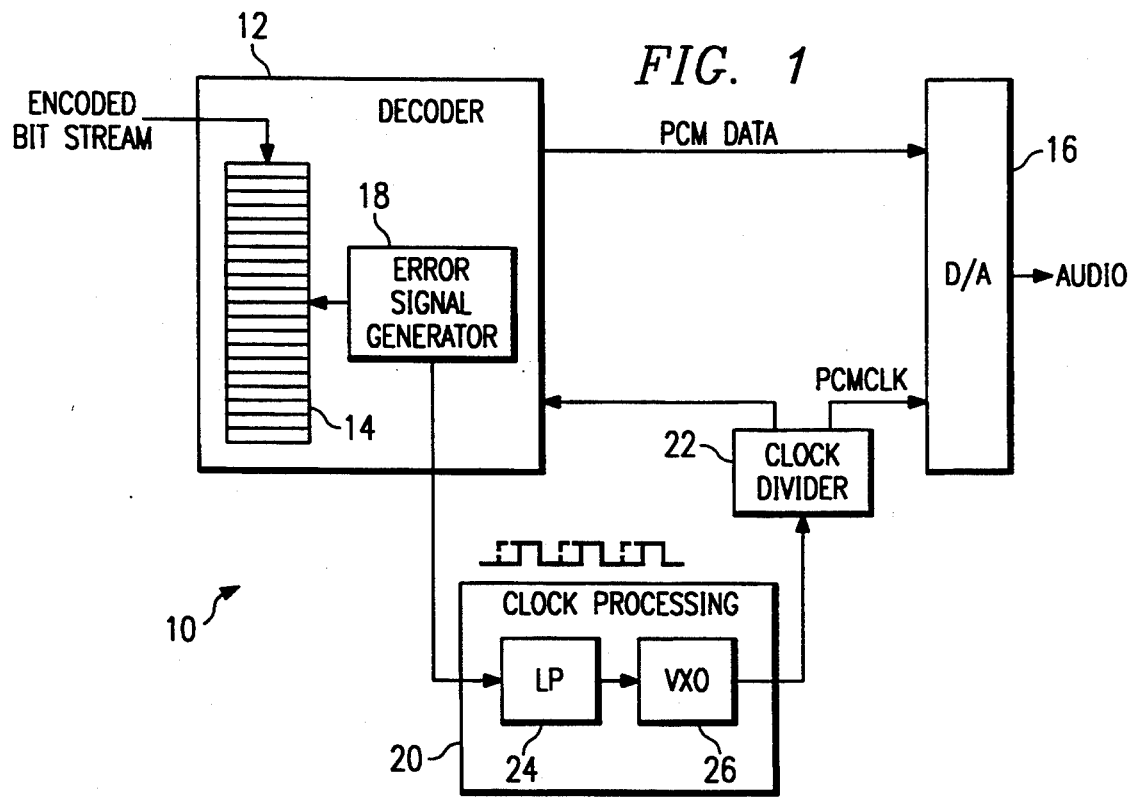
FIG. 1 is a schematic block diagram of the data processing system of the present invention.

Referring to FIG. 1, a data processing system 10 is illustrated which comprises a bit stream decoder circuit 12 which receives an encoded bit stream and places it in an input buffer 14. The decoder circuit 12 may comprise an integrated audio decoding system such as is described in U.S. Pat. application Ser. No. 08/021,007, entitled "Integrated Audio Decoder System", filed Feb. 22, 1993 and assigned to the assignee of the present application, the disclosure of which is hereby incorporated by reference. The encoded bit stream received by decoder system 12 can have a widely varying instantaneous bit rate. As discussed in the previously referenced application, the encoded bit stream can represent audio data that was encoded using a variety of bit rates and sampling rates. Some formats for the bit stream include information directly indicating the exact rate of the encoding process. However, it is possible under the MPEG standard to have an encoded bit stream that contains no information directly specifying the exact rate of the bit stream. The system 10 must operate to provide pulse code modulated data to a digital-to-analog converter circuit 16 at the appropriate rate to prevent overflow or underflow of information within the system 10. Either underflow or overflow of information can result in errors in the audio data output by digital-to-analog converter 16.

According to the teachings of the present invention, the pulse code modulation (PCM) clock signal provided to control output to the digital analog converter 16 is generated to prevent such underflow or overflow problems by recovering the bit rate from the encoded bit stream itself. This is accomplished by ignoring the instantaneous bit rate and calculating a long-term average bit rate which is indicative of the rate of the encoded bit stream. This long-term average is calculated by an error signal generator circuit 18 associated with decoder system 12. Error signal generator circuit 18 outputs a pulse width modulated error signal to a clock processing circuit 20. The clock processing circuit receives the pulse width modulated error signal and generates a PCM clock signal which is used to control output of decoded PCM data from decoder 12 to digital-to-analog converter 16 through an optional clock divider circuit 22.

According to one embodiment of the present invention clock processing circuit 20 may comprise a low pass filter 24 and a variable crystal oscillator (VCO) 26 coupled in series as shown in FIG. 1.

Figure 2:
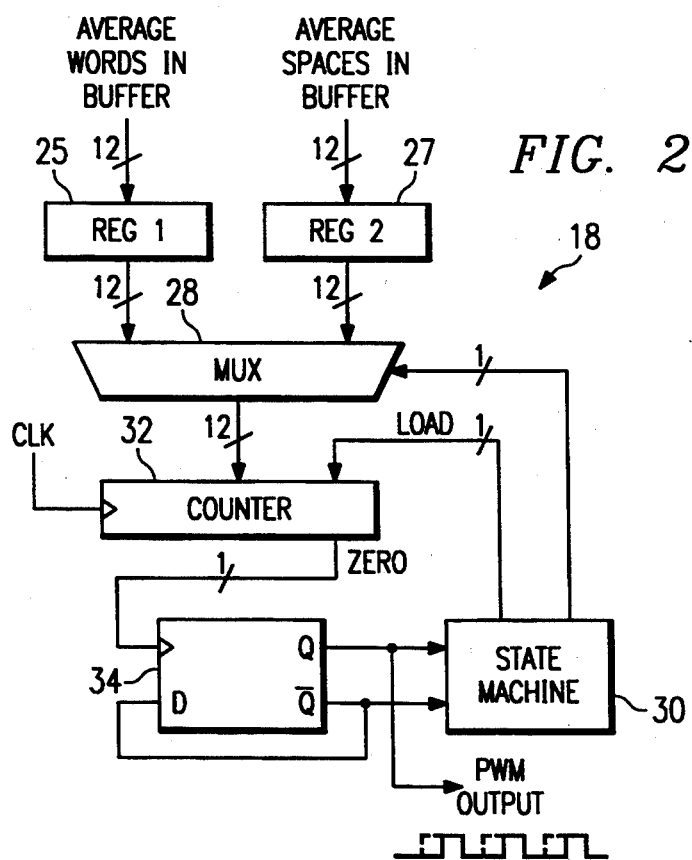
FIG. 2 is a schematic illustration of one embodiment of an error signal generation circuit constructed according to the teachings of the present invention.

Referring to FIG. 2, one embodiment of error signal generating circuit 18 is illustrated in schematic form. The error signal generating circuit 18 operates by retrieving the pointer values used to fill input buffer 14. The pointer values together with the size of the input buffer are used to determine the number of words of unprocessed data stored in the buffer and the number of words of already processed data or empty spaces in the buffer at any given time. The error signal generation circuit 18 calculates a value for the average number of unprocessed words in a buffer and a value for the average number of words of processed data or empty spaces every 24 milliseconds, for example. These average numbers are then used to calculate long-term averages for the number of unprocessed words in the buffer and the number of processed words or spaces in the buffer for an averaging period. The averaging period may be a variable amount of time which may range from ½ second to 3 seconds in length, for example. The long-term average of the number of unprocessed words in the buffer is supplied as a 12-bit number to a first register 25 shown in FIG. 2. The long-term average of the number of processed words or spaces in the buffer is supplied to a second register 27. Register 25 and register 27 are each coupled to a multiplexer 28 which is driven by a state machine 30. The multiplexer 28 routes either the number stored in register 25 or the number stored in register 27 to a counter circuit 32 which is clocked using a clock signal CLK. The counter 32 is loaded responsive to a LOAD signal supplied by state machine 30. The counter circuit 32 decrements the value received from either register 25 or register 27 until zero is reached, at which time a ZERO signal is activated. The ZERO signal is output to a CLOCK input of a latch circuit 34. The D input and the inverted output of the latch circuit 34 are coupled together and to an input of state machine 30. The non-inverting output of latch circuit 34 is coupled to the state machine 30 and supplies the pulse width modulated error signal output to clock processing circuit 20.

The state machine 30 functions to alternatively load the numbers stored in first register 25 and second register 27 into the counter circuit 32. Accordingly, the pulse width modulator output comprises a square wave signal having a positive duty cycle proportional to the value of the number stored in first register 25 and a negative duty cycle proportional to the number stored in second register 27. Accordingly, the pulse width modulated error signal provides an indication as to the tendency of the input buffer 14 to tend toward underflow or overflow at any given time. Such a tendency indicates whether or not the processing and output speed of data processing system 10 is synchronized with the average bit rate of the encoded bit stream received by decoder system 12.

The pulse width modulated error signal is supplied to the low pass filter 24 which converts the square wave signal to a DC voltage signal, the value of which indicates the relationship of the positive and negative duty cycles of the pulse width modulated error signal. The DC voltage is supplied to variable crystal oscillator 26 to supply the PCM clock signal to clock the output of decoder 12 and input of digital-to-analog converter 16. Accordingly, a feedback loop is established whereby the PCM clock signal will track the average bit rate of the encoded bit stream.

According to one embodiment of the present invention, a clock divider circuit 22 can be interposed between clock processing system 20 and the clock inputs that control transfer of PCM data from decoder 12 to digital-to-analog converter 16. Clock divider circuit 22 can provide flexibility within system 10 to allow for the varying requirements of different digital-to-analog converters 16. For example, some digital-to-analog converters provide for oversampling which requires a proportional PCM clock input.

If desired, the clock divider circuit 22 can be formed on the same chip as the remainder of decoder system 12.

According to this embodiment, the output of the variable crystal oscillator 26 is returned to a clock divider input pin on the integrated decoder system 12 and the PCM clock signal is an output from the integrated decoder system 12.

According to another aspect of the present invention, the error signal generation system 18 can monitor the rate of change of the average number of words in the buffer or the rate of change of the average number of spaces in the buffer which are, of course, related in a linear fashion. The error signal generation system 18 can use this information to adjust the long-term averaging period to optimize the operation of the system 10. For example, if the rate of change increases, the error signal generation system is calculating the long-term average too often and as such the long-term average can be stepped up from, for example, ½ second to a second or from a second to 2 seconds.

According to another aspect of the present invention, the step size within the adjustable averaging period operation can itself be nonuniform. For example, if an original step of from ½ second to one second does not sufficiently quiet the rate of change of the average value, the error signal generation can then jump a full second in an attempt to obtain the correct averaging period.

According to an alternative embodiment of the present invention, the clock divider circuit 22 is eliminated and the PCM clock signal is supplied directly to the inputs that control transfer of PCM data to digital-to-analog converter 16. Many digital-to-analog converters contain some input buffering and supply a word clock signal to indicate the readiness to receive another group of digital data. In this manner, the PCM data output by decoder system 12 can be output a word at a time using the word clock signal output from digital audio converter 16 as an output enable signal returned to the decoder system 12.

Although the present invention has been described in detail, it should be understood that various changes, substitutions and alterations may be made to the embodiments described herein without departing from the spirit and scope of the invention as solely defined by the appended claims.

What is claimed is:

1. A data processing system for decoding an encoded bit stream of a digital signal having a varying instantaneous bit transmission rate, said system comprising:
a decoder circuit operable to receive the encoded bit stream, process the bit stream at a bit processing rate, and output decoded data;
an input buffer circuit associated with said decoder circuit;
averaging circuitry associated with said decoder circuit and operable to periodically determine information indicative of a bit rate difference between the bit processing rate and an average over time of said instantaneous bit transmission rate of the encoded bit stream; said averaging circuit being operable to periodically determine an amount of processed data or empty space in said input buffer and an amount of unprocessed data in said input buffer, the relative values of said amounts indicating said difference; and
a signal generating circuit operable to generate and output an error signal for controlling the output of said decoded data, responsive to the value of said difference.

2. The system of claim 1, further comprising a clock processing circuit coupled to said sisal generating circuit to receive said error signal and generate an output clock signal proportional to said average instantaneous bit transmission rate of the encoded bit stream.

3. The system of claim 2, wherein said error signal comprises a pulse width modulated error signal and wherein said clock processing circuit comprises:
a low pass filter operable to convert said pulse width modulated error signal into a DC voltage level; and
a variable oscillator coupled to said low pass filter and operable to receive said DC voltage level and produce said output clock signal responsive to the value of said DC voltage level.

4. The system of claim 3, further comprising a clock divider circuit coupled to said variable oscillator and operable to receive said output clock signal and produce a divided clock signal having a period proportional to said output clock signal.

5. The system of claim 2, further comprising a digital-to-analog converter circuit coupled to said decoder circuit and to said clock processing circuit and operable to receive decoded data from said decoder circuit and to convert and output said decoded data at a rate responsive to said output clock signal.

6. The data processing system of claim 1, wherein the encoded bit stream is encoded using the MPEG standard audio encoding syntax.

7. A data processing system for processing an encoded bit stream and outputting decoded data comprising:
a decoder circuit operable to receive the encoded bit stream;
an input buffer circuit associated with said decoder circuit;
averaging circuitry associated with said decoder circuit and operable to periodically determine an amount of processed data or empty space in said input buffer and an amount of unprocessed data in said input buffer, the relative values of said amounts being indicative of a difference between the processing rate of the system and the average bit transmission rate of the encoded bit stream; and
a signal generating circuit operable to generate and output an error signal responsive to the value of said difference; said error signal comprising a pulse width modulated signal having a positive duty cycle having a duration proportionate to said amount of processed data or empty space in said input buffer and having a negative duty cycle having a duration proportionate to said amount of unprocessed data in said input buffer.

8. The system of claim 7, wherein said signal generating circuit comprises:
a first register operable to receive and store a first value indicative of said amount of processed data or empty space in said input buffer;
a second register operable to receive and store a second value indicative of said amount of unprocessed data in said input buffer;
a multiplexer having a multiplexer output and two inputs respectively coupled to said first and second registers and operable to selectively route said first and second values to said multiplexer output;
a counter circuit coupled to said multiplexer output and operable to receive and decrement values from said multiplexer, said counter circuit being further operable to generate and output a zero signal when a received value has been decremented to zero;
a latch circuit operable to receive said zero signal and to generate a pulse width modulated output signal, said latch circuit being operable to transition said pulse width modulated output signal responsive to said zero signal; and
a state machine circuit coupled to said multiplexer circuit and said counter circuit and operable to alternatively load said first and second values in said counter circuit such that said positive duty cycle of said pulse width modulated output signal is proportional to said first value, and said negative duty cycle of said pulse width modulated output signal is proportional to said second value.

9. A method for processing an encoded bit stream and outputting decoded data comprising the steps of:
receiving the encoded bit stream in a decoder circuit;
using averaging circuitry associated with the decoder circuit, periodically determining an amount of processed data or empty space in an input buffer and an amount of unprocessed data in the input buffer, the relative values of the amounts being indicative of a difference between the processing rate of the system and the average bit transmission rate of the encoded bit stream; and
generating and outputting an error signal responsive to the value of the difference; said error signal comprising a pulse width modulated signal having a positive duty cycle having a duration proportionate to the amount of processed data or empty space in the input buffer and having a negative duty cycle having a duration proportionate to the amount of unprocessed data in the input buffer.

10. A data processing system for decoding an encoded bit stream of a digital signal having a varying instantaneous bit transmission rate, said system comprising:
a decoder circuit operable to receive the encoded bit stream, process the bit stream at a bit processing rate, and output decided data;
averaging circuitry associated with said decoder circuit and operable to periodically determine information indicative of a bit rate difference between the bit processing rate and an average over time of said instantaneous bit transmission rate of the encoded bit stream; and
a signal generating circuit operable to generate and output an error signal for controlling the output of said decoded data, responsive to the value of said difference;
wherein said averaging circuitry is further operable to determine a rate of change of said information indicative of said difference and to adjust the time period over which said information is calculated, responsive to said determination of said rate.

11. A data processing system for processing an encoded bit stream and outputting decoded bit stream;
a decoder circuit operable to receive the encoded bit stream;
averaging circuitry associated with said decoder circuit and operable to periodically determine information indicative of a difference between the processing rate of the system and the average bit transmission rate of the encoded bit stream; and
A signal generating circuit operable to generate and output an error signal responsive to the value of said difference;

said averaging circuitry being further operable to determine a rate of change of said information indicative of said difference and to adjust the time period over which said information is calculated, in nonuniform increments responsive to said determination of said rate.

12. A data processing system for decoding an encoded bit stream comprising:
a decoder circuit operable to receive the encoded bit stream, process the bit stream at a bit processing rate, and output decoded data;
averaging circuitry associated with said decoder circuit and operable to periodically determine information indicative of a bit rate difference between the bit processing rate and an average over time of said instantaneous bit transmission rate of the encoded bit stream;
a signal generating circuit operable to generate and output a pulse width modulated error signal responsive to the value of said difference;
a low pass filter operable to convert said pulse width modulated error signal into a DC voltage level;
a variable oscillator coupled to said low pass filter and operable to receive said DC voltage level and produce an output clock signal responsive to the value of said DC voltage level; and
an input buffer circuit associated with said decoder circuit;
said averaging circuit being operable to periodically determine an amount of processed data or empty space in said input buffer and an amount of unprocessed data in said input buffer, the relative values of said amounts indicating said difference; and
said signal generating circuit being operable to generate a pulse width modulated signal having a positive duty cycle having a duration proportionate to said amount of processed data or empty space in said input buffer and having a negative duty cycle having a duration proportionate to said amount of unprocessed data in said input buffer.

13. The system of claim 12 wherein said signal generating circuit comprises:
a first register operable to receive and store a first value indicative of said amount of processed data or empty space in said input buffer;
a second register operable to receive and store a second value indicative of said amount of unprocessed data in said input buffer;
a multiplexer having a multiplexer output and two inputs respectively coupled to said first and second registers and operable to selectively route said first and second values to said multiplexer output;
a counter circuit coupled to said multiplexer output and operable to receive and decrement values from said multiplexer, said counter circuit being further operable to generate and output a zero signal when a received value has been decremented to zero;
a latch circuit operable to receive said zero signal and to generate a pulse width modulated output signal, said latch circuit being operable to transition said pulse width modulated output signal responsive to said zero signal; and
a state machine circuit coupled to said multiplexer circuit and to said counter circuit and operable to alternatively load said first and second values in said counter circuit such that said positive duty cycle of said pulse width modulated output signal is proportional to said first value and said negative duty cycle of said pulse width modulated output signal is proportional to said second value.

14. The system of claim 12, further comprising a clock divider circuit coupled to said variable oscillator and operable to receive said output dock signal and produce a divided clock signal having a period proportional to said output clock signal.

15. A method for decoding an encoded bit stream of a digital signal having a varying instantaneous bit transmission rate, said method comprising the steps of:
receiving the encoded bit stream in a decoder circuit;
processing the bit stream at a bit processing rate;
outputting decoded data;
periodically determining information indicative of a bit rate difference between the processing rate of the system and an average over time of said instantaneous bit transmission rate of the encoded bit stream using averaging circuitry associated with the decoder circuit; and
generating and outputting an error signal responsible to the value of the difference;
wherein said step of periodically determining comprises the step of periodically determining an amount of processed data or empty space in an input buffer and an amount of unprocessed data in the input buffer, the relative values of the amounts indicating the difference.

16. The method of claim 15, further comprising the step of receiving the error signal and generating an output clock signal proportional to the average instantaneous bit transmission rate of the encoded bit stream.

17. The method of claim 16, wherein, in said generating and outputting step, the error signal comprises a pulse width modulated error signal and wherein said step of generating said output clock signal comprises the steps of:
converting the pulse width modulated error signal into a DC voltage level using a low pass filter; and
receiving the DC voltage level and producing the output clock signal responsive to the value of the DC voltage level using a variable oscillator coupled to the low pass filter.

18. The method of claim 16, further comprising the step of converting said decoded data from digital-to-analog format utilizing said dock signal.

19. A method for decoding an encoded bit stream of a digital signal having a varying instantaneous bit transmission rate, said method comprising the steps of:
receiving the encoded bit stream in a decoder circuit;
processing the bit stream at a bit processing rate;
outputting decoded data;
periodically determining information indicative of a bit rate difference between the processing rate of the system and an average of time of said instantaneous bit transmission rate of the encoded bit stream using averaging circuitry associated with the decoder circuit; and
determining a rate of change of the information indicative of the difference and adjusting the time period over which the information is calculated responsive to the determination of the rate.

20. A data processing system for decoding an encoded bit stream of a digital signal for presentation of said decoded bit stream at a digital-to-analog converter for conversion into analog signal form, comprising:
a decoder circuit operable to receive an encoded bit stream of said digital signal and decode said received bit stream in accordance with a varying instantaneous bit rate determined from said bit stream; said decoder including a buffer circuit into which said encoded bit stream is received;

means associated with said decoder circuit and said buffer circuit for periodically determining an average over time of said varying instantaneous bit rate; said means for periodically determining an average comprising circuitry for providing a pulse width modulated error signal indicative of said average; and means associated with said decoder circuit for presenting said decoded bit stream at an output for use in conversion at a conversion bit rate defined by said determined average.

21. A data processing system for decoding an encoded bit stream of a digital signal for presentation of said decoded bit stream at a digital-to-analog converter for conversion into analog signal form, comprising:

a decoder circuit operable to receive an encoded bit stream of said digital signal and decode said received bit stream in accordance with a varying instantaneous bit rate determined from said bit stream; said decoder including a buffer circuit into which said encoded bit stream is received;

means associated with said decoder circuit and said buffer circuit for periodically determining an average over time of said varying instantaneous bit rate;

means associated with said decoder circuit for presenting said decoded bit stream for use in conversion at a conversion bit rate defined by said determined average and a digital-to-analog converter connected to receive said decoded bit stream;

wherein said means for presenting said decoded bit stream comprises means for clocking said digital-to-analog converter in accordance with said conversion bit rate.

22. The system of claim 20, wherein said means for presenting said decoded bit stream at said output comprises means for clocking said presenting of said decoded bit stream in accordance with an output clocking signal derived from said pulse width modulated error signal.

23. The system of claim 22, wherein said means for clocking said presenting of said decoded bit stream comprises means for clocking said presenting in accordance with a pulse code modulated clocking signal.

24. The system of claim 23, wherein said means for presenting said decoded bit stream further comprises a clock processing circuit having an input connected to receive said pulse width modulated error signal and an output connected to deliver said pulse code modulated clocking signal.

25. The system of claim 24, wherein said clock processing circuit comprises a low pass filter and a variable crystal oscillator coupled in series.

26. The system of claim 25, wherein said means for presenting said decoded bit stream further comprises a dock divider circuit connected to said clock processing circuit output.

27. A data processing system for decoding an encoded bit stream of a digital signal for presentation of said decoded bit stream at a digital-to-analog converter for conversion into analog signal form, comprising:

a decoder circuit operable to receive an encoded bit stream of said digital signal and decode said received bit stream in accordance with a varying instantaneous bit rate determined from said bit stream; said decoder including a buffer circuit into which said encoded bit stream is received;

means associated with said decoder circuit and said buffer circuit for periodically determining an average over time of said varying instantaneous bit rate; and means associated with said decoder circuit for presenting said decoded bit stream for use in conversion at a conversion bit rate defined by said determined average;

wherein said buffer circuit includes means for receiving said encoded bit stream and decoding the same based upon address pointer values; and wherein said means for periodically determining an average comprises an error signal generating circuit for calculating an average from said pointer values.

28. A data processing system for decoding an encoded bit stream of a digital signal for presentation of said decoded bit stream at a digital-to-analog converter for conversion into analog signal form, comprising:

a decoder circuit operable to receive an encoded bit stream of said digital signal and decode said received bit stream in accordance with a varying instantaneous bit rate determined from said bit stream; said decoder including a buffer circuit into which said encoded bit stream is received;

means associated with said decoder circuit and said buffer circuit for periodically determining an average over time of said varying instantaneous bit rate; and means associated with said decoder circuit for presenting said decoded bit stream for use in conversion at a conversion bit rate defined by said determined average;

wherein said means for periodically determining an average comprises an error signal generating circuit for determining a value representative of an average number of words of unprocessed data stored in said buffer circuit.

29. The system of claim 28, wherein said value is a first value, and wherein said error signal generating circuit further comprises means for determining a second value representative of an average number of words of processed data or spaces in said buffer; and means, responsive to said determined first and second values, for generating a square wave signal having a duty of given positive or negative sign proportional to the value representative of the average number of words of unprocessed data and a duty cycle of opposite negative or positive sign proportional to the value representative of the average number of words of processed data or spaces.

30. The system of claim 29, wherein said error signal generating circuit comprises a first register;

means for supplying said first value to said first register;

a second register;

means for supplying said second value to said second register;

a counter circuit;

a state machine; and means, coupled to said first and second registers and to said state machine, for alternately providing each of said values supplied to said first and second registers to said counter in response to signals received from said state machine.

31. A data processing system for decoding an encoded bit stream of a digital signal for presentation of said decoded bit stream at a digital-to-analog converter for conversion into analog signal form, comprising:
- a decoder circuit operable to receive an encoded bit stream of said digital signal and decode said received bit stream in accordance with a varying instantaneous bit rate determined from said bit stream; said decoder including a buffer circuit into which said encoded bit stream is received;
- means associated with said decoder circuit and said buffer circuit for periodically determining an average over time of said varying instantaneous bit rate; and
- means associated with said decoder circuit for presenting said decoded bit stream for use in conversion at a conversion bit rate defined by said determined average;
- wherein said means for periodically determining said average further comprises means for monitoring the rate of change of said average over time; and means responsive to said monitored rate of change, for adjusting the period over which said average is determined.

32. A data processing system, comprising:
- a digital-to-analog circuit;
- a decoder circuit operable to receive an encoded bit stream, decode the bit stream and output said decoded bit stream to said digital-to-analog converter;
- averaging circuitry associated with said decoder circuit for generating a signal indicative of an average bit rate of information received in the encoded bit stream;
- clock processing circuitry connected to receive said generated signal and output a clocking signal having a frequency set in response to receipt of said generated signal; and
- means for clocking said output of said decoded bit stream to said digital-to-analog converter in response to said clocking signal.

33. The system of claim 32, wherein said averaging circuitry comprises an error signal generating circuit for providing a pulse width modulated error signal indicative of said average bit rate; and
- wherein said clock processing circuitry comprises circuitry for generating a pulse code modulated clocking signal having a frequency set in response to said pulse width modulated error signal.

34. The system of claim 33, further comprising an input buffer associated with said decoder circuit for receiving said encoded bit stream; and
- wherein said error signal generating circuit comprises a circuit for providing said error signal based on an average over an averaging period of time of an unprocessed portion of said bit stream in said input buffer.

35. The system of claim 37, wherein said error signal generating circuit further includes means for adjusting said averaging period of time over which said average is taken in response to a time variation of said average.

* * * * *